United States Patent [19]

Blaske et al.

[11] Patent Number: 4,564,585
[45] Date of Patent: Jan. 14, 1986

[54] PROCESS FOR FABRICATING NEGATIVE PRESSURE SLIDERS

[75] Inventors: Paul S. Blaske, Maple Grove; Larry D. Zimmerman, Apple Valley; Arthur Calderon, Minnetonka; Leroy L. Longworth, Buffalo, all of Minn.

[73] Assignee: Magnetic Peripherals, Inc., Minneapolis, Minn.

[21] Appl. No.: 671,062

[22] Filed: Nov. 13, 1984

Related U.S. Application Data

[63] Continuation-in-part of Ser. No. 555,763, Nov. 28, 1983, abandoned.

[51] Int. Cl.$^4$ ................................. G03C 5/00
[52] U.S. Cl. ..................................... 430/313; 430/317; 430/318; 430/320; 430/323; 430/329; 156/643; 156/659.1
[58] Field of Search ............... 430/313, 317, 318, 320, 430/323, 329; 156/329, 659.1, 643

[56] References Cited

U.S. PATENT DOCUMENTS 4,052,603 10/1977 Karlson ............................. 364/120
4,375,390 3/1983 Anderson et al. .................... 204/15

OTHER PUBLICATIONS

Hitchner et al., IBM Technical Disclosure Bulletin, vol. 24, No. 2, Jul. 1981, p. 995.
Nakanishi et al., IEEE Transactions on Magnetics, vol. Mag-16, No. 5, Sep. 1980, pp. 785-787.
Gloersen, Solid State Technology, Apr. 1976, pp. 68-73.

Primary Examiner—J. Travis Brown
Attorney, Agent, or Firm—Edward L. Schwarz; Joseph A. Genovese

[57] ABSTRACT

A process for fabricating a negative pressure slider is disclosed which briefly comprises the steps of: (a) applying a dry negative photoresist layer to the surface of the slider; (b) positioning a mask having alignment marks which are too narrow to be resolved during exposure and development to pattern the photoresist layer to expose the portions of the flying surface of the slider to be milled by an ion milling process; (c) ion milling the slider wherein the patterned photoresist layer protects the flying surface of the slider while the negative pressure cavities of the slider are being milled; and (d) removing the remaining portions of the photoresist layer once the negative pressure cavities have been milled.

4 Claims, 13 Drawing Figures

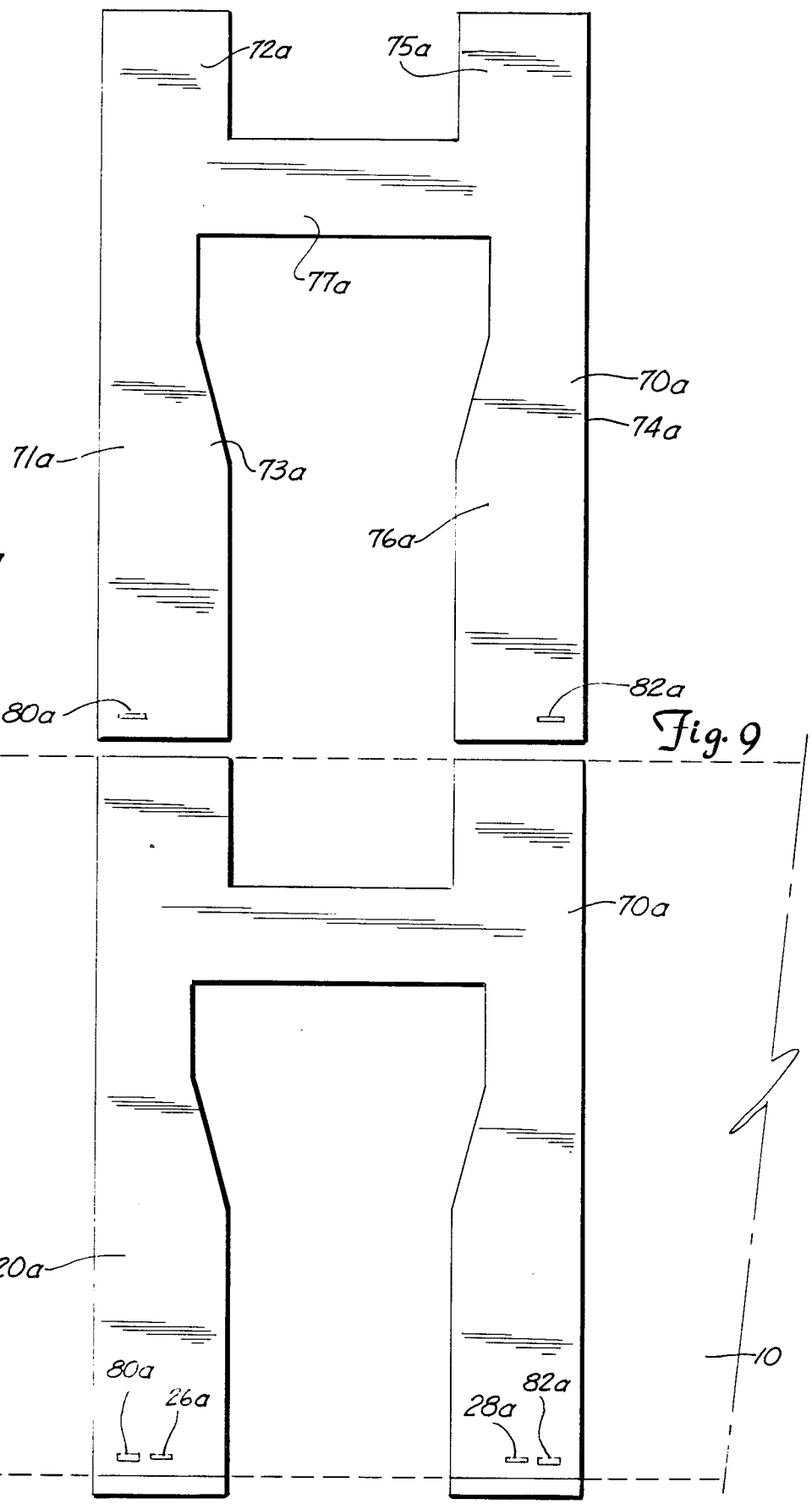

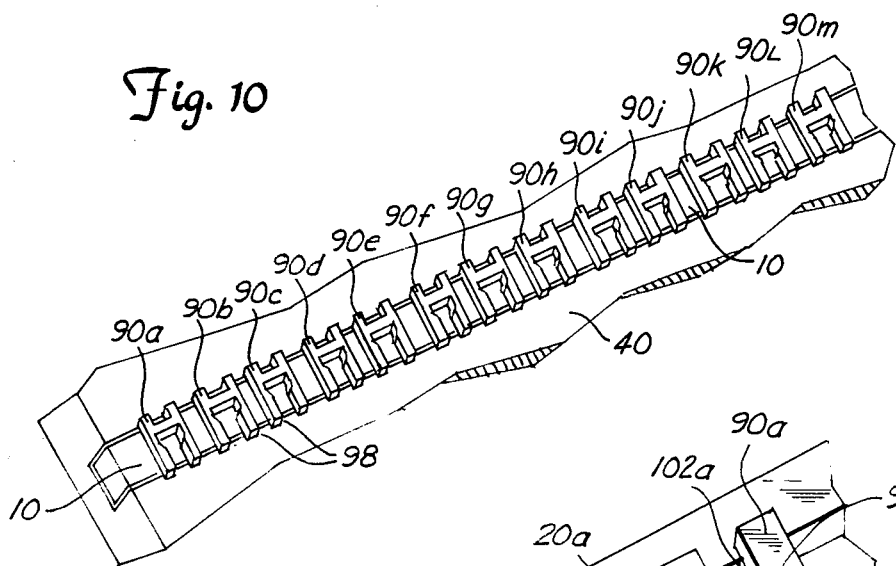
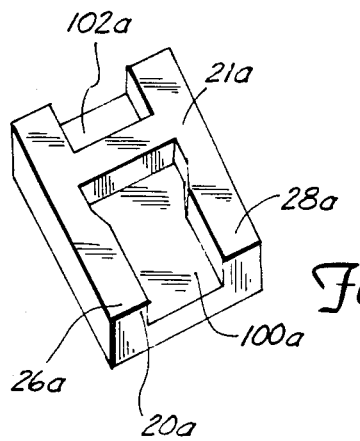
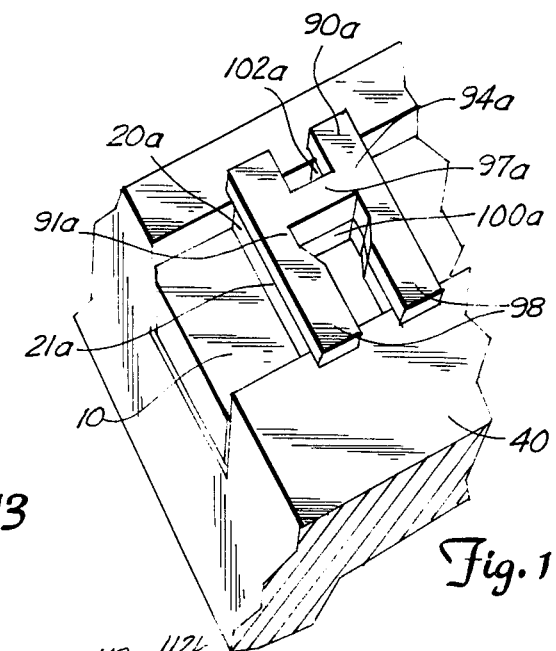

PROCESS FOR FABRICATING NEGATIVE PRESSURE SLIDERS

BACKGROUND

This is a continuation-in-part of a copending application Ser. No. 06/555,763 filed on Nov. 28, 1983, now abandoned, by the same applicants as has this application.

The present invention relates to the fabrication of negative pressure sliders.

Current magnetic disk drives employ spring biased air bearing sliders which rely on the fact that their low flying height above the disk surface can be achieved by an air bearing created between the spring biased slider and the rotating disk. The slider typically carries a magnetic read/write head at its trailing edge. The slider "floats" on the air bearing and its flying height is controlled by the external loading force of the spring bias on the slider. The flying height should be as low as possible to avoid loss of signal. With this type of slider, in order to decrease the flying height, the external loading force is increased.

This spring biased type of slider operates on a contact start/stop basis wherein the slider is physically in contact with the disk at the start of disk rotation and until the disk achieves a certain speed at which time the air bearing can be set up to lift the slider off of the disk. As the rotation of the disk later comes to a stop, the slider returns to direct contact with the disk. Where the loading force is increased in order to lower the flying height, the wear that occurs between the surface of the disk and the slider during start and stop operations also increases. It is possible to reduce frictional wear by using what is known as a negative pressure slider. This type of slider has a negative pressure cavity on its air bearing surface to create a vacuum which pulls the slider toward the disk. The air flow generated by the surface of the recording medium produces a negative pressure region, or partial vacuum, in the negative pressure cavity of the air bearing surface which reduces the loading force required to achieve the desired flying height. Examples of such negative pressure sliders are shown in U.S. Pat. Nos. 3,811,856 and 4,141,049.

With this type of slider, the depth and configuration of the negative pressure cavity (or cavities) determines the flying height of the slider. Consequently, the negative pressure cavity of the flying surface of the slider must be very accurately formed.

It is literally impossible to accurately and reproduceably machine mechanically a cavity of the size and shape required. Some alternatives to machining the cavity are chemical etching, plasma etching, and ion beam milling.

In the past, it has been suggested that the slider cavities can be ion milled using a metal layer mask to protect the flying surface of the slider while the cavities are being milled. See, for example, IEEE Transactions on Magnetics, Vol. Mag 16, No. 5, September, 1980, entitled "Floating Thin Film Head Fabricated By Ion Etching Method" by T. Nakanishi, et al. In an ion miling process which utilizes a metal mask, generally the metal (usually chrome) is first sputtered onto the slider; photoresist is then spin-coated onto the slider; the photoresist is patterned to expose what will become the negative pressure cavity; the metal layer is then chemically etched out of the cavity; the photoresist is removed, the slider cavities are ion milled with the metal layer protecting the flying surface of the slider; and finally, the remaining portions of the metal layer are removed by chemical etching.

Various problems have been experienced in the use of the foregoing process. First of all, the requirement of sputtering and etching a metal layer increases the cost and complexity of the process, as well as the time required to complete the process. Furthermore, it has been quite difficult to accurately locate the negative pressure cavities on the slider. In addition, only relatively shallow slider cavities can be milled using this process in that the metal protective layer can withstand the ion milling operation only up to cavity depths of approximately four microns. As shown in the flying height versus cavity depth curve of FIG. 1, which is typical for sliders having negative pressure cavities of the type shown in the present invention and in U.S. Pat. Nos. 4,286,297 and 4,141,049, in order to achieve a flying height of 10 micro inches, the cavities must be fabricated to a depth of either 2 microns or 12 microns. Since the curve has a greater slope at the 2 micron point than at the 12 micron point, it is more desirable to fabricate the slider cavities to a depth of 12 microns so that variations in the actual depth of the cavity will have a less dramatic effect on flying height. However, due to the limitations of the process of the prior art described above, only relatively shallow cavities in the range of up to 4 microns, for example, can be fabricated. See, for example, IEEE Transactions on Magnetics, Vol. Mag. 15, No. 3, May 1979, entitled "Narrow Track Magnetic Head Fabricated by Ion Etching Method" by T. Nakanishi, et al, wherein the statement is made that "great etching depths cannot be obtained with the ion milling method."

SUMMARY

To overcome the problems of the prior art, the present invention discloses a process wherein relatively deep negative pressure cavities can be ion milled to a precise depth of 12 microns or more. The process accomplishes this objective while avoiding the necessity of applying a protective metal layer and thereby reduces the complexity and cost of fabrication as compared to prior processes. In addition, the process ensures that the negative pressure cavities are very precisely located on the slider to further control flying height and improve the performance of the slider.

Very briefly, according to the process of the present invention, a relatively thick dry negative photoresist material layer is applied to the air bearing surface of the slider and is patterned using a photolithographic mask having a pattern precisely locating the negative pressure cavities on the slider air bearing surface. Alignment marks in the mask are placed in a predetermined spatial relationship with the pole tips of the magnetic heads of the slider for alignment of the mask. These alignment marks are so thin that the photoresist layer cannot resolve them, avoiding the problem of these marks creating a void in the photoresist layer after developing. Negative, rather than positive photoresist must be used so that during alignment the pole tips are visible through the mask apertures. Once the thick photoresist layer has been patterned, the cavities are ion milled with the photoresist layer protecting the flying surface of the slider. The remaining photoresist layer is then removed.

BRIEF DESCRIPTION OF THE DRAWINGS

FIG. 7 shows a typical H-shaped pattern of the mask 60.

FIG. 9 shows an enlarged view of the H-shaped pattern 70a superimposed upon one end of the slider bar 10.

FIG. 10 shows the slider bar 10 after the photoresist layer has been patterned, with a portion of the process fixture 40 broken away.

FIG. 11 shows an enlarged view of one end of slider bar 10 after the photoresist layer has been patterned and the slider cavities have been ion milled, with a portion of the process fixture 40 broken away.

FIG. 12 shows the slider bar 10 after the ion milling operation with the remaining portions of the photoresist layer removed.

FIG. 13 shows a negative pressure slider at the completion of the process.

DESCRIPTION OF THE PRESENTLY PREFERRED EMBODIMENT OF THE INVENTION

Figure 1:
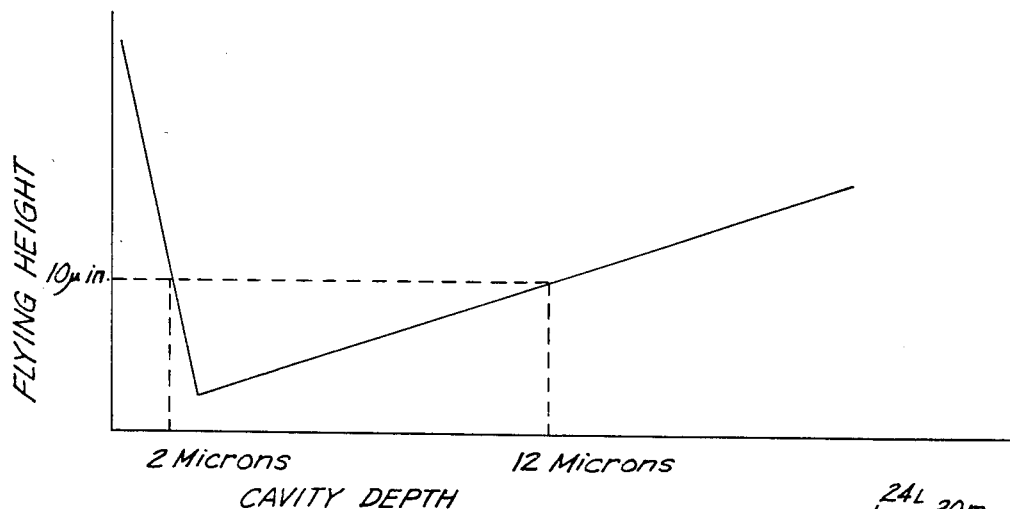
FIG. 1 shows a flying height versus cavity depth graph for the slider of the present invention.
Figure 2:
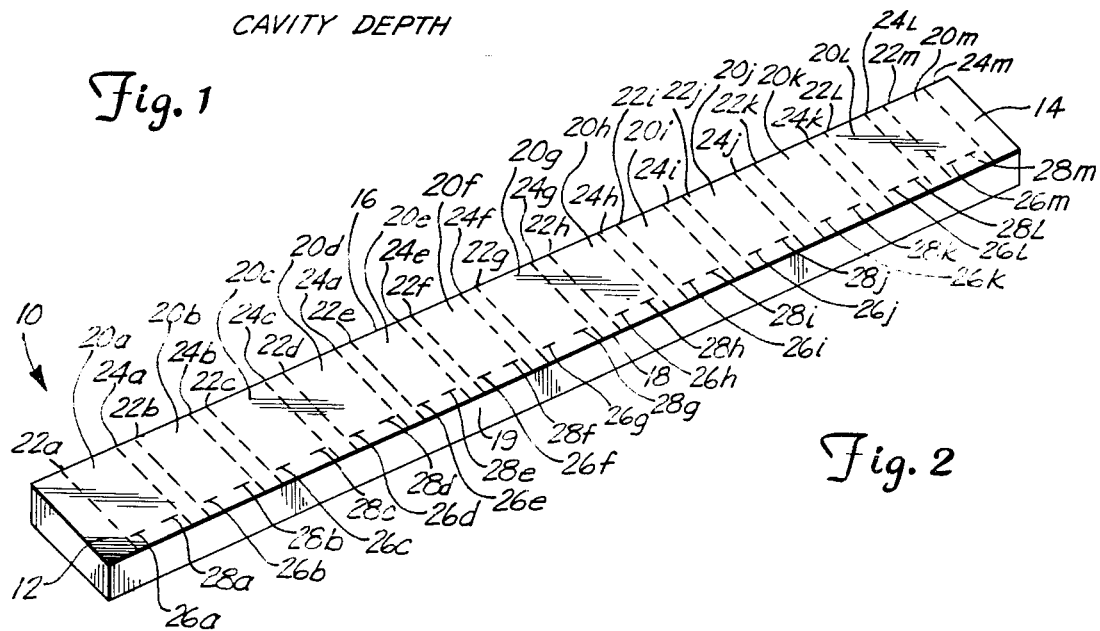
FIG. 2 shows a perspective view of the slider bar 10 prior to the formation of the negative pressure cavities according to the process of the invention.

The process of the invention is applied in the presently preferred embodiment to a slider bar 10 shown in FIG. 2 and from which individual sliders are to be sawn. Bar 10 has a first end 12 and an oppositely disposed second end 14. Slider bar 10 also has a leading edge 16, a trailing edge 18 and a trailing surface 19 normally disposed from edge 18. A plurality of adjacently positioned sliders 20a-20m are disposed between the ends 12 and 14. Each to-be-sawn slider is bounded by a pair of dotted lines 22a, 24a; 22b, 24b; 22c, 24c; etc., as shown. Once the slider cavities have been milled into the slider bar 10, as will be later described, the slider bar 10 will be cut along these dotted lines to remove the 13 sliders 20a-20m. Slider 20a comprises a first end slider and the oppositely disposed slider 20m comprises a second end slider with sliders 20b-20l comprising intermediate sliders. Each slider 20a-20m includes a pair of magnetic read/write heads (not shown) which are disposed adjacently to the trailing edge 18 of slider bar 10. The magnetic heads are thin film heads and are applied by well known thin film technology to the trailing surface 19 of the sliders 20a-20m. Each magnetic head has a pole tip, or read/write gap, which is disposed at the flying surface of the associated slider and has an accurately predetermined position therein. For example, slider 20a has pole tips 26a, 28a; slider 20b has pole tips 26b, 28b; and so on. The magnetic head pole tips are in the portion of the slider which flies most closely to the recording media and reads and/or writes on the media. The pole tips 26a-26m, 28a-28m, are visible to the eye by magnification once the slider bar has been secured in a projection aligner and can be used for alignment of a photolithographic mask defining the size, shape, and position of the negative pressure cavities since the pole tips are accurately positioned with respect to the air bearing surfaces.

Slider bar 10 can be comprised of Alsimag, FOTOCERAM or ferrite, for example. FOTOCERAM is a trademark of Corning Glass Works, Corning, New York.

Having described the slider bar 10, the process for manufacturing it according to the present invention will now be described.

Figure 4:
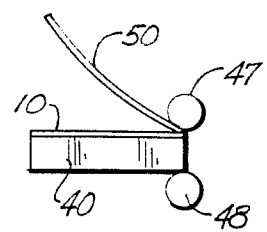
FIG. 4 shows the slider bar 10 being inserted into the photoresist lamination device.

A layer 50 of transparent negative dry film photoresist material such as DuPont de Nemours and Company's RISTON is first applied to the slider bar 10, as illustrated in FIG. 4. Such photoresist, which one typically exposes with ultraviolet or other light, may be soluble where unexposed in a chlorinated hydrocarbon solvent developer such as 1,1,1-trichloroethane. The cyanoacrylate or other adhesive used to bond bar 10 to a carrier fixture 40 as explained below should resist dissolving by the photoresist developer. This negative type photoresist, after being developed by having its unexposed areas dissolved by the chlorinated hydrocarbon developer, leaves a pattern of photoresist material corresponding to the areas exposed to the activating ultraviolet or other light, hence its characterization as negative. During creation of the 10-12 micron deep cavities desired in bar 10, at least 1-1.5 mils (25-40 microns) of photoresist is removed by the ion milling process. It is important that the photoresist material 50 not be perforated anywhere during milling, since this will cause milling in areas on the slider bar 10 where it should not occur. Therefore, the photoresist material 50 applied should be at least 2 mils (50 microns) thick so that some margin of safety is present.

The photoresist material must be transparent so that pole tips 26a-26m, 28a-28m are visible through it. During the alignment phase of this process, the pole tips are thus available for positioning of the mask.

Figure 3:
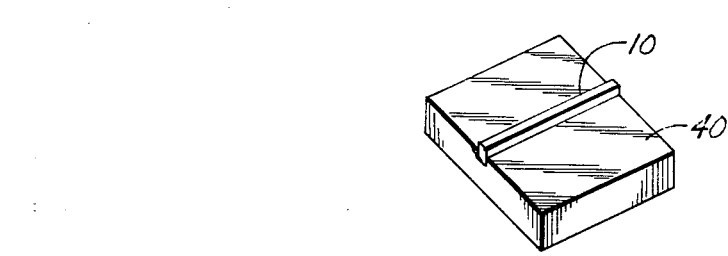
FIG. 3 shows the slider bar 10 supported by a process fixture.
Figure 5:
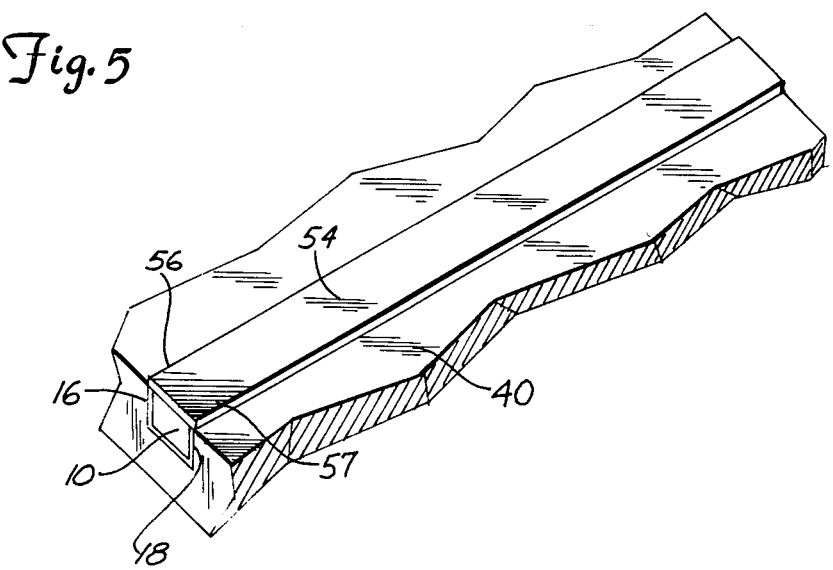
FIG. 5 shows the slider bar 10 after the photoresist layer 54 has been applied, with a portion of the process fixture 40 broken away.

To apply the photoresist to slider bar 10, the bar 10 is first placed in an aluminum process fixture 40, shown in FIG. 3. It is preferable that slider bar 10 be mounted in the fixture 40 by bonding with an adhesive such as cyanoacrylate. This adhesive is dissolved by several aromatic hydrocarbon solvents, such as methyl ethyl ketone and acetone, but not by chlorinated hydrocarbon solvents such as the 1.1.1 trichloroethane used for developing the photoresist. Dissolving the adhesive during developing frees the bar prematurely from the fixture 40. The slider bar 10 extends 1 mil. above the fixture 40 as shown. Bar 10 remains in the fixture 40 throughout nearly the entire process as will become apparent. Prior to applying the photoresist layer the bar 10 and fixture 40 go through a prelamination bake step wherein the bar is heated to a surface temperature of 90° C. to improve adhesion of the photoresist. Following the prelamination bake step, the fixture 40 and bar 10 are inserted between the rollers 47, 49 of a roller laminating machine such as the DYNACHEM Model #120, manufactured by the Thiokol/Dynachem Corporation, Elmhurst, Illinois. See FIG. 4. The upper roller 47 pressure applies a sheet of dry film photoresist material 50 to the bar 10 so that it adheres as a layer 54 to the bar 10 as shown in FIG. 5. The photoresist layer 54 is applied so that overlapping portions 56, 57, respectively, extend out over the leading and trailing edges of bar 10.

The portion 57 extending beyond the trailing edge 18 protects the thin film heads laminated to the trailing surface 19 of bar 10 from the ion beam during the milling step (later described).

Figure 6:
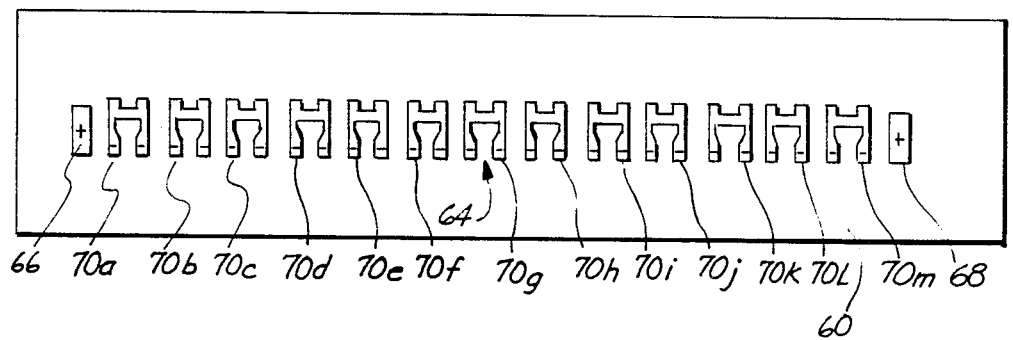
FIG. 6 shows the photolithographic mask 60 of the present invention.

Once photoresist layer 54 has been applied, slider bar 10 and fixture 40 are mounted in the workpiece holder of a projection alignment machine (not shown) such as a Cobilt Model #CA400A, manufactured by the Cobilt Corp., Sunnyvale, Calif. A photolithographic mask 60, shown in FIG. 6, is placed in the mask holder of the projection aligner. Mask 60 is opaque except for aperture pattern 64 which is transparent to both ultraviolet and visible light. Pattern 64 is comprised essentially of a plurality of equally spaced and adjacently positioned, identical H-shaped apertures 70b-70l which are disposed between the first end aperture 70a and the second end aperture 70m. Exposure pattern 64 includes a first gross adjustment window 66 which is outwardly disposed from first end aperture 70a, and a second gross adjustment window 68 which is outwardly disposed from second end aperture 70m. A typical H-shaped aperture 70a is shown in more detail in FIG. 7. Aperture 70a is comprised of a pair of vertically running legs 71a, 74a which are connected by a horizontally disposed crosswise member 77a. Leg 71a has an upper portion 72a and a lower portion 73a. Likewise, leg 74a has an upper portion 75a and a lower portion 76a. In the lowermost portion of the leg 71a, an alignment mark 80a is disposed formed of an opaque line. Likewise, an alignment mark 82a formed of an opaque line is disposed in the lowermost portion of leg 74a as shown. Further opaque alignment marks are disposed in corresponding positions in at least one other aperture, preferably aperture 70m at the opposite end of mask 60 if only one other aperture has such marks.

The alignment marks 80a, 82a, etc., are each placed in a predetermined location within apertures 70a-70m such that when the marks are aligned in a predetermined spatial relationship with the pole tips 26a-26m, 28a-28m, the mask is positioned so that the areas on the air bearing surfaces defined by apertures 70a-70m thereof accurately correspond to the areas surrounding the negative pressure cavities. The spatial relationship can be any of several which can be visually recognized during the alignment step so as to permit the mask's accurate positioning on bar 10's air bearing surface to define the precise eventual position of the negative pressure cavities. During alignment the alignment marks 80a, 82a, etc. and pole tips 26a-26m and 28a-28m are illuminated with visible light to aid alignment.

Because the pole tips 26a-26m, 28a-28m are the only distinguishable features inherently present and accurately positioned in the surface to be milled, it is much preferred that they be used for alignment. Since the pole tips themselves should not be milled, the use of transparent negative type photoresist is necessary, so that the pole tips are visible through the mask apertures during alignment. The alignment marks 80a, 82a, etc., occupy only a small area of the mask apertures, as shown in FIG. 7.

We have found that alignment marks 80a, 82a, etc., cannot be resolved by the photoresist to create developable areas on the 2 mil photoresist if they are thinner than around 5 microns (200 uin.) for a material such as RISTON. That is, the 2 mil photoresist material has resolving ability only for lines of thickness greater than 200 uin. Of course, other photoresist materials and thicknesses may have either finer or coarser line resolving ability than the 200 uin. specified, and this places constaints on the width chosen for these marks 80a and 82a, for the following reason. It is important that marks 80a, 82a, etc., not create a developable pattern in photoresist layer 54 since then the milling step will create a cavity in the air bearing surface adjacent the pole tips, which is undesirable, any may possibly even cause some milling of the pole tips to occur. At the same time the alignment marks must be thick enough to be visible under the magnification to the operator during alignment, a condition satisfied by 200 uin. lines. Further, line thicknesses in the 200 uin. neighborhood are within a few hundred percent of the typical pole tip 26a-26m, 28a-28m dimensions, permitting the predetermined spatial relationship between alignment marks 80a, 82a, etc., and pole tips 26a, 28a, etc., to be easily recognized and achieved by the operator while (s)he is aligning mask 60 on the air bearing surface. Thus, the predetermined position of mask 60 can be reliably reached so that the negative pressure cavities are accurately positioned on the air bearing surfaces.

Figure 8:
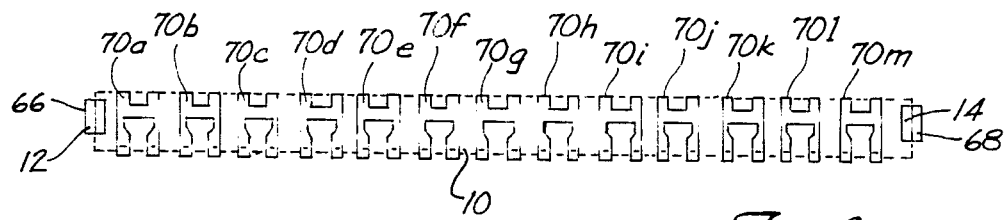
FIG. 8 shows the alignment pattern 64 superimposed upon the slider bar 10.

In order to align the aperture pattern 64 upon the sliders 20a-20m of slider bar 10, the bar 10 and mask 60 are illuminated with visible light which does not photographically expose the photoresist layer 54 and then the bar 10 is moved by a suitable positioning mechanism to symmetrically position the ends 12 and 14 of bar 10 within the gross alignment windows 66 and 68 of pattern 64. (Alternatively, the mask 60 could be moved with the bar 10 being stationary.) FIG. 8 illustrates this positioning of bar 10 with respect to pattern 64. Once this gross alignment has been made, the operator makes a fine alignment of the sliders 20a-20m with the pattern 64 by looking first at end aperture 70a, usually with magnification, and moving the bar 10 until the pole tips 26a, 28a of slider 20a align with the alignment marks 80a, 82a of H-shaped aperture 70a, see FIG. 9, to reach the predetermined spatial relationship. The pole tips 26a, 28a are visible because the photoresist material is transparent to visible light. The marks 80a, 82a have the preferred spatial relationship when they are vertically centered and symmetrically arranged with respect to the pole tips 26a, 28a as shown in FIG. 9. To complete the fine alignment of the bar 10 with the mask 60, the operator next looks at the oppositely disposed end aperture 70m and moves bar 10 to align the pole tips 26m and 28m of slider 20m with the alignment marks 80m, 82m of H-shaped aperture 70m in the very same way as shown in FIG. 9. Once the pole tips of both end sliders 20a and 20m are aligned with the corresponding alignment marks of the apertures 70a and 70m, respectively, the fine alignment step is completed. By utilizing the pole tips of the sliders 20a and 20m as reference points, the negative pressure cavities can be very accurately located on the sliders 20a-20m with respect to the pole tips of individual sliders, and hence accurately located on the individual sliders' air bearing surfaces.

Having aligned the mask pattern 64 on the sliders 20a-20m, ultraviolet light is now projected through the mask 60 to expose the H-shaped apertures 70a-70m onto the photoresist layer 54 of the sliders 20a-20m. By using the negative resist photolithography process, the exposed H-shaped patterns are developed with the unexposed portions of the photoresist layer 54 being removed using a 1,1,1-trichloroethane low-pressure spray, for example. Therefore, at this point in the process, all that remains of photoresist layer 54 are the thirteen H-shaped patterns 90a–90m, which are shown in FIG. 10.

Note that the legs of the H-shaped apertures 70a–70m overhang the leading and trailing edges 16 and 18 of the bar 10. The overlapping portions 98 extending beyond trailing edge 18, protect the exposed portions of the magnetic heads (not shown) which are laminated onto trailing surface 19 as previously discussed. The extension of the photoresist layer to cover the exposed portions of the magnetic heads is extremely important in that during the ion milling operation the ions are projected at the bar 10 at an oblique angle of 45°–25°, for example, with respect to the surface of bar 10. Consequently, the exposed portions of the magnetic heads would be milled if they were not thus protected.

Having patterned the photoresist layer, with the slider bar 10 still secured in process fixture 40, the fixture 40 is now secured in an ion milling machine such as a Model 10-1500-10 Ion Source machine manufactured by Ion Tech, Inc., Fort Collins, Colorado. The fixture 40 is rotated during the ion milling step to encourage uniform milling. Once the ion milling operation is in progress, the H-shaped photoresist patterns 90a–90m protect the directly underlying portions of the sliders 20a–20m from the milling while the negative pressure cavities are being milled to the proper depth. the milling time and ion accelerating voltage and ion current are chosen to mill the cavities to the desired depth. The portion of each slider directly underlying the H-shaped photoresist pattern will comprise the air bearing flying surface of the slider. For example, photoresist pattern 90a protects flying surface 21a of slider 20a See FIGS. 11-13. FIG. 11 shows slider 20a at the completion of the ion milling step with the negative pressure cavities 100a and 102a milled to the proper depth. Cavity 100a is defined by the lower portions of legs 91a, 94a and the crosswise member 97a. Cavity 102a is defined by the upper portions of legs 91a, 94a and the crosswise member 97a. While the cavities 100a, 102a of slider 20a are being milled, the cavities 100b–100m, 102b–102m are simultaneously being milled in the respective sliders 20b–20m. The ion milling of slider bar 10 generates heat which must be dissipated from the bar 10 to protect the sliders 20a–20m from being overheated. In the present embodiment, the process fixture 40 supporting slider bar 10 is secured in the ion milling machine in such a way that the cyanoacrylate adhesive conducts this heat to fixture 40 and thence to cooling water circulating in fixture 40 to prevent overheating of the sliders 20a–20m.

Once the ion milling step is completed, the photoresist patterns 90a–90m can be removed by, for example, washing or submerging the bar 10 first in an acetone bath and subsequently placing it in an ultrasonic cleaning bath. The use of either acetone or methyl ethyl ketone has the additional advantage of freeing the bar 10 from its mounting on fixture 40 simultaneously with the removal of the exposed photoresist film remaining after the ion milling, avoiding another process step.

Following the removal of the remaining portions of the photoresist layer, and the freeing of slider bar 10 from the fixture 40, the result is a bar 10 as shown in FIG. 12 wherein the thirteen sliders 20a–20m each have a pair of accurately located and formed negative pressure cavities 100a–100m and 102a–102m, respectively. The sliders 20a–20m can now be sawn from the slider bar 10. To cut slider 20a from the bar 10, a diamond abrasive wheel can be used to cut along the phantom cut lines 110a, 112a (which correspond to the dotted lines 22a, 24a of FIG. 2). Likewise, the remaining sliders 20b–20m would be removed by cutting at the phantom cut lines 110b–110m and 112b–112m, respectively. The flying surfaces 21a–21m can then be lightly lapped. The sliders 20a through 20m can then be cleaned in acetone and in water to complete the process.

At the conclusion of the process, a typical slider 20a is shown in FIG. 13. The slider 20a has an H-shaped air bearing flying surface 21a and a pair of very accurately located and formed negative pressure cavities 100a, 102a. The pole tips 26a–28a of slider 20a can now be flown over the recording surface at a precisely controlled flying height to optimize performance of the magnetic head.

In the presently preferred embodiment the slider material chosen for slider bar 10 is Alsimag. The photoresist material, which is RISTON as noted, is applied at a thickness of approximatly 48 microns (2 mils). The negative pressure cavities 100a–100m, 102a–102m are ion milled to a depth of 12 microns as noted. To accomplish the 12 micron milling depth using the Ion Tech Model 10-1500-200 model milling machine, an ion accelerating voltage of 1200 volts together with an ion current of 125 milliamps is used for a period of 150 minutes. The ion milling beam is 10 centimeters in diameter. These parameters result in 1.9 watts per square centimeter of power being dissipated at the surface of slider bar 10. As noted above, slider bar 10 is supported in a water cooled fixture 40 to dissipate this heat. While the cavities 110a–110m, 112a–112m are being milled, the RISTON layer is also being milled. Approximately, 36 microns of the 48 micron RISTON layer are milled away while the slider cavities are milled to the 12 micron depth.

Typically, the milling angle of the ion beam is 45° with respect to the surface being milled. To avoid redeposition of the milled material on the milled surface, however, the milling angle can be varied. For example, with a FOTOCERAM slider bar, a milling angle of 25° prevents redeposition.

Hence, the above-described process provides for very accurate locating of the negative pressure cavities of the slider while also providing for precisely formed cavities, having a depth of 12 microns as desired. Moreover, the process is greatly simplified over that used in the prior art in that the metal deposition and patterning step is eliminated.

Obviously, while the present embodiment shows thirteen adjacent sliders being simultaneously fabricated using the process of the present invention, other configurations of sliders could also be used with corresponding changes in the mask which is used to pattern the photoresist layer.

Having disclosed the presently preferred embodiment of the invention, many variations and mofifications thereof will be obvious to those skilled in the art, and accordingly, the invention is intended to be limited only by the scope of the appended claims.

We claim:

1. A process for forming on each air bearing surface carried on a bar from which a plurality of air bearing sliders can be sawn each having a magnetic head whose pole tip projects to the air bearing surface of the slider and has a predetermined position therein, a negative pressure cavity of predetermined shape and having a predetermined position spaced apart from and with respect to the pole tip in the slider's air bearing surface, comprising the steps of:

(a) applying a layer of transparent negative photoresist material to said air bearing surfaces including the pole tips, said photoresist material having resolving ability only for lines greater than a preselected width; then (b) positioning adjacent to the air bearing surfaces a mask having a pattern of apertures defining the entire portions of the air bearing surfaces surrounding the negative pressure cavities, at least two of said apertures having within them at predetermined locations alignment marks comprising opaque lines of width less than the preselected width, said positioning step including positioning the mask with the alignment marks in a predetermined spatial relationship with the pole tips in the air bearing surfaces thereby positioning the opaque areas of the mask to define on the air bearing surfaces the positions to be occupied by the negative pressure cavities; then (c) photographically exposing the photoresist material using light shining through the mask, to create therein a pattern of unexposed photoresist material corresponding to the predetermined shape and position of the negative pressure cavities; then (d) removing the mask; then (e) developing the photoresist to remove unexposed areas of it by washing with a solvent dissolving unexposed areas; and then (f) ion milling the air bearing surfaces to create the negative pressure cavities.

2. The method of claim 1, including the preliminary step of mounting the bar on a fixture by bonding with an adhesive which resists dissolving by the solvent used for developing the photoresist; and wherein the photoresist material removal step includes washing the fixture and bar with a solvent dissolving both the photoresist material and the adhesive bonding the bar to the fixture.

3. The method of claim 2, wherein the bar mounting step includes mounting the bar on the fixture using cyanoacrylate as the adhesive, and the photoresist material applying step includes applying photoresist which can be dissolved in either of methyl ethyl ketone and acetone.

4. The method of claim 3, wherein the photoresist material applying step includes applying photoresist material approximatey 2 mils thick, and having resolving ability only for lines greater than 200 microinches.

* * * * *